United States Patent [19]
Wood

[11] 3,795,316
[45] Mar. 5, 1974

[54] INDUSTRIAL WASTE PROCESSING APPARATUS

[76] Inventor: Norman E. Wood, 20 Edgewater Ln., Rochester, N.Y. 14617

[22] Filed: May 2, 1973

[21] Appl. No.: 333,005

Related U.S. Application Data

[63] Continuation-in-part of Ser. No. 135,282, April 19, 1971, abandoned.

[52] U.S. Cl................ 210/298, 210/312, 210/320, 210/526, 210/532
[51] Int. Cl....................... B01d 21/24, B01d 21/04
[58] Field of Search............ 210/295–298, 312–316, 210/320, 400, 407, 524, 525, 526, 532, 159, 160, 172

[56] References Cited
UNITED STATES PATENTS

| 3,456,798 | 7/1969 | Urdanoff.......................... 210/298 X |
| 3,385,448 | 5/1968 | Honan et al. ..................... 210/407 |
| 2,861,688 | 11/1958 | Harms............................. 210/298 X |

*Primary Examiner*—Samih N. Zaharna
*Assistant Examiner*—T. A. Granger

[57] ABSTRACT

Industrial waste handling apparatus having side by side elongate tanks, one a waste receiving and settling tank, and the other a suspended waste filtration tank, with cross flow below liquid level from the one tank to the other, each of the tanks having an inclined end portion extending upward to a discharge disposed above the liquid level. A solid apron conveyor is disposed in the settling tank extending along near the bottom and the inclined end portion to the discharge, and a strainer grid is disposed above the bottom of the other tank providing a sump therebelow for liquid withdrawal. A drag line conveyor with scraper bars moves over the grid and up the incline, and a submerged weir disposed in the settling tank over the cross flow prevents buoyant material from escape to the filtration tank, the apron conveyor skimming surface oil and removing heavy waste. Liquid velocity from the receiving end of the settling tank to the cross flow opening is equal to the speed of the apron conveyor.

6 Claims, 3 Drawing Figures

INDUSTRIAL WASTE PROCESSING APPARATUS

REFERENCE TO RELATED APPLICATION

This is a continuation-in-part of application Ser. No. 135,282, filed Apr. 19, 1971, now abandoned.

BACKGROUND OF THE INVENTION

This invention relates to the handling of industrial waste, particularly in relatively large automated metal machining plants.

In large scale metal machining operations, there is a continuous supply of waste comprising cutting coolant mixed with metal turnings, chips and the like and tramp oil, from which recovery of the coolant and metals is highly desirable, the coolant being reusable after clarification, and the metals having substantial scrap value. The present invention is directed to apparatus for receiving such waste in substantial quantity which is adapted to separate the turnings and chips continuously while delivering the fluid suspended materials to clarification apparatus.

BRIEF SUMMARY

More particularly the apparatus employs two tanks disposed side by side, one tank adapted to receive the waste, and separate therefrom the metal chips, turnings and the like, while delivering the remainder containing suspended material, to the second tank for further separation and withdrawal. In the first tank a continuous apron conveyor is provided to carry turnings, balled up materials and other non-buoyant waste from the tank. The second tank having a dragline conveyor operating over wedge wire strainers is designed to separate the coarse suspended material from the liquid. Cross flow from the first tank to the second tank is provided by openings in adjacent side walls of the two tanks, and includes a submerged weir to prevent the non-suspended non-buoyant chips and turnings and floating oil and other materials from reaching the second tank, thus preventing fouling of the dragline conveyor, and strainers which would interrupt continuous operation and result in shut-downs. Thus, the liquid transfer between the two tanks does not act as an overflow system which tends to set up unwanted turbulence and allows floating material, especially tramp oil, to transfer from tank to tank.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

FIGURE DESCRIPTIONS

In the drawings, wherein like reference characters indicate like parts:

DETAILED DESCRIPTION

Figure 1:
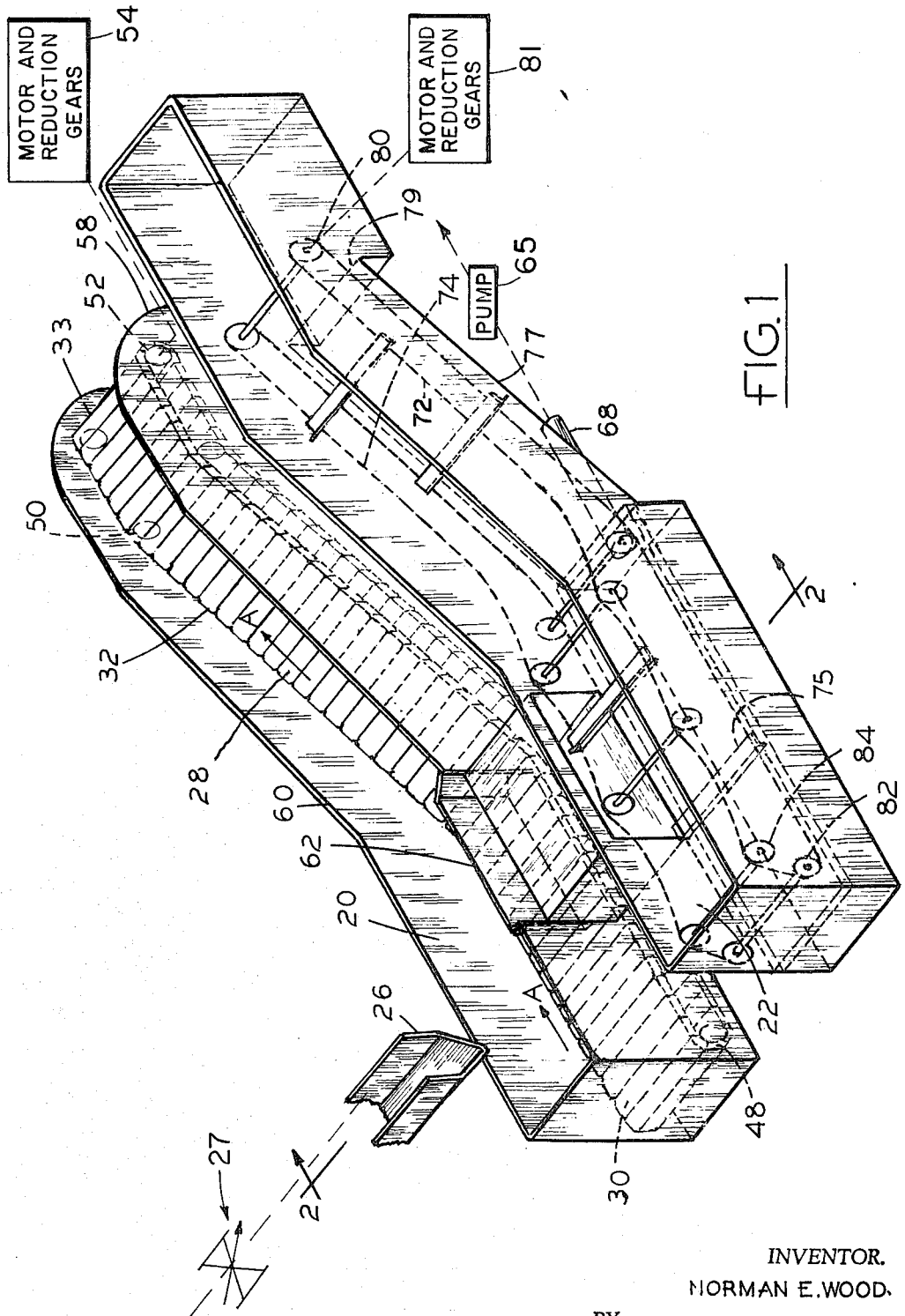
FIG. 1 is a somewhat diagrammatic perspective view of the cross flow tanks with the tanks separated to avoid confusion.
Figure 2:
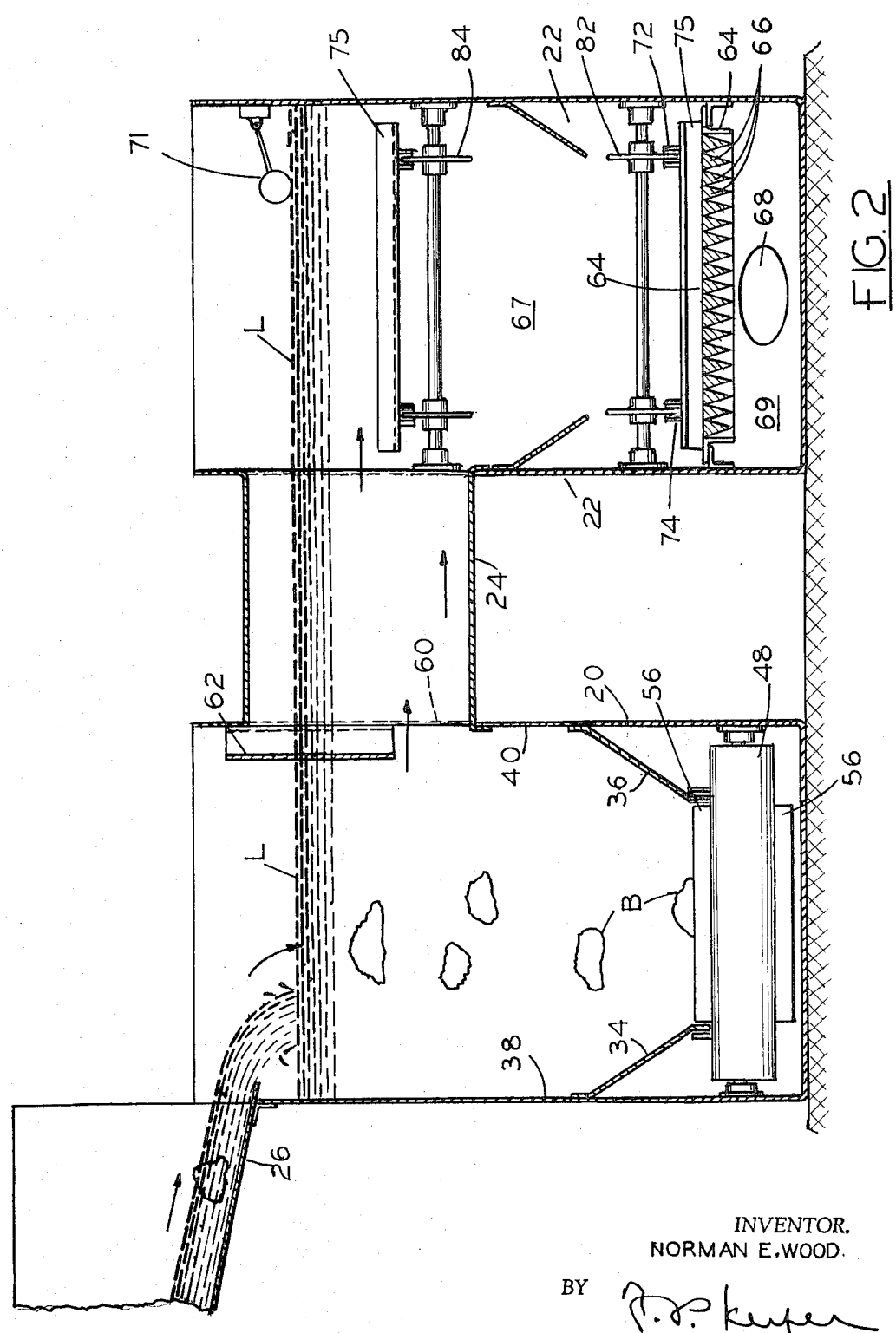
FIG. 2 is a sectional view taken substantially on the broken line 2—2 of FIG. 1.

Referring to FIGS. 1 and 2 there are shown elongate rectangular tanks 20 and 22 disposed side by side, connected by a cross flow conduit 24. Tank 20 is supplied with waste comprising turnings, chips and other waste which is flushed by cutting coolant and other waste liquids through sluiceways in the floor leading to a collecting sluiceway discharging as at 26 into a supply end of the tank 20, opposite an inclined discharge end. Appropriate flow control means, diagrammatically indicated at 27 are provided at any convenient point in the liquid supply line for selectively varying the rate of flow into tank 20. Within the tank 20 is a belt type apron conveyor 28 having a relatively horizontal section 30 located in the bottom of the tank at the sluiceway supply end, such conveyor having an inclined portion 32 leading to the discharge end, indicated by reference numeral 33. Inclined guides 34 and 36, attached to the side walls 38 and 40 of the tank 20, cause the heavier material such as balled up turnings, chips and the like to gravitate upon the upper portion of the conveyor belt. The return portion of the belt is indicated as running below rollers 48 and 50 and 52, upon which the upper transport reach of the belt is supported. The belt extends around end rollers 50 and 52, one of which, such as 52 is power driven by a suitable motor and reduction gear (now shown) as will be understood in the art. Suitable transverse flight members 56 are affixed to the belt at spaced intervals to insure the carrying of balled turnings and the like, indicated at B, up the incline to the dumping station 58, which is above the liquid level L maintained in the tanks 20 and 22.

In the side wall 40 of the tank 20 is an open window 60 to permit cross flow from tank 20 to tank 22, the opening 60 being protected by a submerged weir 62, to prevent floating wastes, such as tramp oil and turnings, from transferring from tank 20 to tank 22. The window opening 60 is shown as located about one quarter of the way down the tank 20, from the supply end, so that the non-floatables discharged into the tank at the end, will have adequate time to gravitate to the conveyor belt 28 before being carried along the tank by flow. Preferably, opening 60 is spaced at the maximum distance from the supply ends permitted by the inclined construction toward the discharge end.

The tank 22 receives the waste liquid and suspended matter through the window opening 60 and acts as a filter strainer. The tank is provided with a wedge grid 64 comprising a plurality of wedge bars 66 closely spaced so as to screen out coarse material. One form of such wedge grids or screens appears in Johnson U.S. Pat. No. 2,129,428. It will be seen that the wedge grids act to divide the tank 22 into an upper portion 67, and a sump or suction box 69 for fluids containing finely suspended material, which may flow through the wedge grids. The sump is connected to a withdrawal conduit 68 and a suitable pump 65 which delivers the liquids and suspended fines to clarification apparatus, which separates the metal and the cooling liquid from the remainder. To maintain the level L of the liquid in the tanks 20 and 22 a float level control, indicated at 71 may be employed which controls the withdrawl of liquid from the sump through the withdrawal conduit 68.

Operating above the wedge grids 64 in the tank 22 is a dragline conveyor comprising endless side chains 72 and 74 carrying a plurality of scraper bars 75, which drag along the wedge grids and along the inclined portion 77 of the tank, which inclined portion extends from the upper surface of the wedge grids 64, the wedge grids forming in effect a bottom for the upper portion 67 of the tank 22. The drag bars 75 carry the coarse materials that cannot pass through the wedge grid into the sump 69, up the incline 77, and keep the wedge grids open. The coarse material is carried to the upper end of the incline and discharged into suitable receiving receptacles disposed below the discharge lip 79.

The fines which pass through the wedge grid into the sump are pumped with the liquid to suitable clarification apparatus. The drag line conveyor chains pass around suitable sprockets such as 80 and 82 at opposite ends, and such intermediate sprockets 84 as may be desired. The sprockets 80 are preferably driven by power through a reduction gear 81. The scraper bars operate on a continuous basis and keep the upper surface of the wedge grids clear so that the wedge grids may be continuously effective to allow the flow of the liquid through the grid to the sump, carrying with it such suspended material that is sufficiently fine to pass between the wedge grid bars. The scraper bars in keeping the wedge grids clear, gather the coarser material which cannot pass through the grids, and deliver the coarse material up the incline to be discharged into receptacles disposed below the discharge end.

Figure 3:
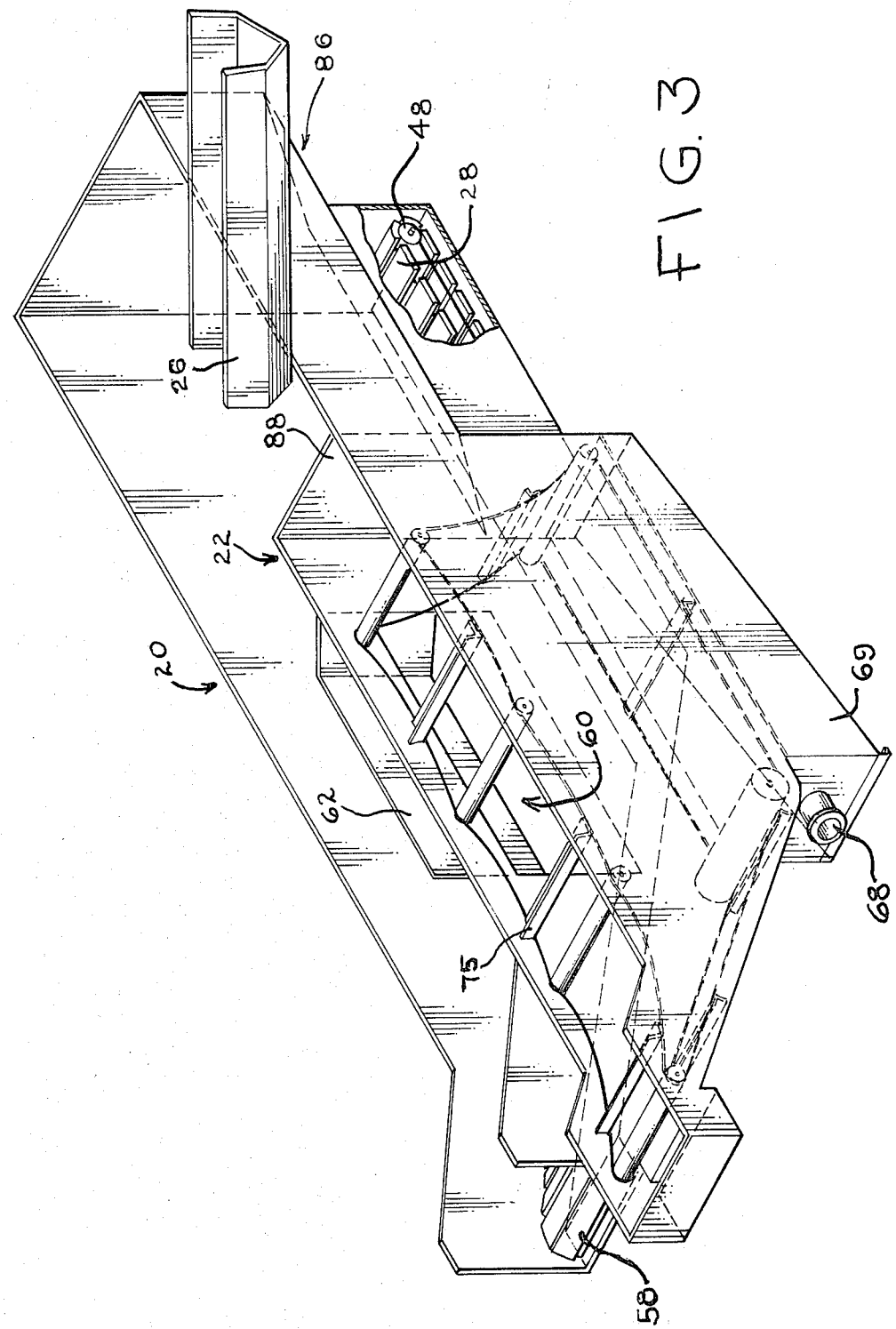
FIG. 3 is a perspective view showing the tanks combined in a more compact embodiment.

In practice, it will be understood that the tanks 20 and 22 may be formed as one tank with a common partition having the window opening, an example of such construction being shown in FIG. 3 wherein reference numerals common to FIGS. 1 and 2 are used to denote elements which are the same in the two embodiments. Tank 20 includes side portion 86 which has a downwardly sloping lower wall leading into the supply end of the tank 20 above apron conveyor 38. Rear wall 88 separates tank 22 from side portion 86 and wall 90 includes opening 60, through which the two tanks communicate, as in the previous embodiment. A conveyorized settling tank, having a solid, apron type conveyor operating completely below liquid level at the supply end, is thus combined in both embodiments with a conveyorized filtering tank.

The continuous apron type conveyor mounted in the bottom of the tank 20, is well below the minimum operating liquid level in the tank. The discharge end of the conveyor will be sloped at a shallow angle to discharge at a point above the nominal liquid level in the tank. The apron shielding 34 and 36 of the conveyor will be effected so that all the turnings must fall directly onto the apron area of the conveyor to prevent entanglement in the conveyor mechanism or supports. The trench, or sluice-way, with its high velocity liquid movement will enter at 26 above the liquid level "L" at a point at the rear of the tank where the inlet velocity and turbulence can be dissipated. The liquid will then migrate forward in tank 20 to opening 60 to permit the liquid to flow through the side wall into tank 22. The cross-sectional area of the wetted portion of tank 20 will be such that the flow rate through the system, at the proper liquid height, will develop a cross-sectional velocity in the liquid essentially equal to the apron conveyor speed. Such relative velocity may be established by cooperatively regulating the incoming liquid flow rate by control means 27, the apron conveyor speed by means of motor 54, and the liquid outflow rate by means of pump 65. This promotes maximum settling efficiency by effectively eliminating turbulence at the point of liquid transfer, and is best achieved by making the area of the opening or window equal to the cross sectional wetted area of the settling tank to insure that the liquid velocity in the rear of the tank is equal to the conveyor speed. The length of the tank 20 will be such that the fall velocity of the turnings being handled in conjunction with the cross sectional velocity of the liquid through the tank, will permit all of the large turnings to fall through the liquid to the apron conveyor prior to the time that the volume of liquid would reach the opening 60 in tank 20 leading to tank 22. The opening in the side wall or partition between tanks 20 and 22 is guarded by the depressed weir, so that any floating materials in tank 20 will be prevented from migrating through the opening to tank 22. The lower edge of opening 60 is far enough above the top surface of apron conveyor 28 that the liquid flowing through the opening will not carry settled solids into tank 22. Tank 22, being essentially a filter-strainer, collects the suspended particulate matter which is not economically removed by settling.

Tank 22 with its conventional dragline conveyor having angle iron scraper bars 75, drags along the bottom of the tank and the wedge grids flush therewith and thereafter, progress up an incline to discharge above the liquid level. The suction box beneath the strainer is connected to conventional pumping equipment 65 to create a flow of liquid through the straining material. The movement of the conveyor can be either continuous or programmed intermittent-movement, depending upon the volume of particulate to be removed.

In summary, the apparatus includes the apron conveyor mounted well below liquid level in a non-turbulent area moving at the velocity of the liquid, thus assuring a zero relative velocity between the conveyed turnings and the liquid, a common liquid level between the two tanks, thereby not introducing any further turbulence or increased velocity at the transfer point. The extension of the apron conveyor comes through the liquid level in a still area at which point the tramp oil has been accumulated, thus offering the surface area of the turnings and the apron conveyor to the tramp oil so that it may be removed and deposited in a receptacle for further processing. That is, as the solids on the apron conveyor break the surface at the discharge end, they act as an oil skimmer. There is no liquid motion or turbulence at the discharge end which would tend to prevent solids from rising, on the apron conveyor, and being removed from the liquid.

It can be seen that the apparatus maintains a continuous flow of turnings through the equipment as presented from the collection system, and, thus prevents overloading of secondary chip process equipment, and reduces maintenance on chip handling equipment and tankage. It has the capability of handling bundles of turnings if the bundles were generated prior to introduction into the tankage.

What is claimed is:

1. Industrial waste handling apparatus for separating solids and immiscible liquids from a carrier liquid, said apparatus comprising, in combination:
   a. a first elongate tank having side and bottom walls, a receiving end and an upwardly inclined portion leading to an elevated discharge end;

b. means for delivering to the receiving end of said first tank the carrier liquid with solids and immiscible liquids therein;
c. a solid, apron type conveyor disposed within said first tank and extending adjacent said bottom wall between said receiving and discharge ends to transport solids which settle to the surface of said apron conveyor out of said first tank;
d. a second elongate tank having side and bottom walls, a receiving end and an upwardly inclined portion leading to an elevated discharge end;
e. wedge grid strainer means disposed within said second tank in spaced relation to said bottom wall to define a space beneath said strainer means for receiving liquid passing through said strainer means;
f. a drag conveyor disposed within said second tank and having a lower reach extending adjacent said strainer means for scraping contact therewith to transport solids deposited on said strainer means out of said second tank;
g. means defining an opening between said receiving and discharge ends of each of said first and second tanks through which fluid may flow from said first to said second tanks to maintain the same fluid level in each; and
h. outlet means for removing strained liquid from said space beneath said strainer means.

2. The invention according to claim 1 and further including means so regulating the supply of liquid to said first tank and removal of liquid from said second tank, and the speed of said apron conveyor that the speed of liquid flowing from the receiving end of said first tank to said opening is substantially equal to the speed of said apron conveyor.

3. The invention according to claim 1 wherein said opening is located in a side wall of said first tank a substantial distance from said receiving end thereof.

4. The invention according to claim 3 wherein said opening includes top and bottom edges and said bottom edge is a substantial distance above the upper surface of said apron conveyor.

5. The invention according to claim 4 and further including a baffle within said first tank extending in spaced, superposed relation to said opening from above said top edge thereof to a terminating edge intermediate of said top and bottom edges, whereby liquid from the upper surface must flow downwardly to pass under said terminating edge to flow from said first to said second tank.

6. The invention according to claim 5 wherein the side wall of said first tank wherein said opening is defined is also a side wall of said second tank.

* * * * *